United States Patent

[11] 3,598,981

| [72] | Inventors | Ben D. Conger<br>West Long Branch;<br>Alfred G. Tonnessen, Neptune, both of, N.J. |
|---|---|---|
| [21] | Appl. No. | 808,094 |
| [22] | Filed | Mar. 18, 1969 |
| [45] | Patented | Aug. 10, 1971 |
| [73] | Assignee | Electronic Associates, Inc.<br>Long Branch, N.J. |

[54] CAPACITOR-SWITCHING CIRCUIT
2 Claims, 1 Drawing Fig.

[52] U.S. Cl. ............................................. 235/183, 330/86
[51] Int. Cl. ............................................. G06g 7/18
[50] Field of Search ............................................. 235/183; 307/113, 115, 130; 330/7, 86, 103

[56] References Cited
UNITED STATES PATENTS

| 3,153,202 | 10/1964 | Woolam | 235/183 X |
| 3,374,362 | 3/1968 | Miller | 235/183 X |
| 3,433,937 | 3/1969 | McCarthy | 330/103 X |
| 3,480,769 | 11/1969 | Gilbert | 235/183 |
| 3,488,597 | 1/1970 | Schlein | 235/183 X |

*Primary Examiner*—Malcolm A. Morrison
*Assistant Examiner*—Jerry Smith
*Attorneys*—Edward A. Petko and Robert M. Skolnik

ABSTRACT: A circuit is disclosed providing six time scales for an analog integrator by selectively connecting only three input terminals and automatically connecting the proper valued HOLD capacitor for the resultant time scale.

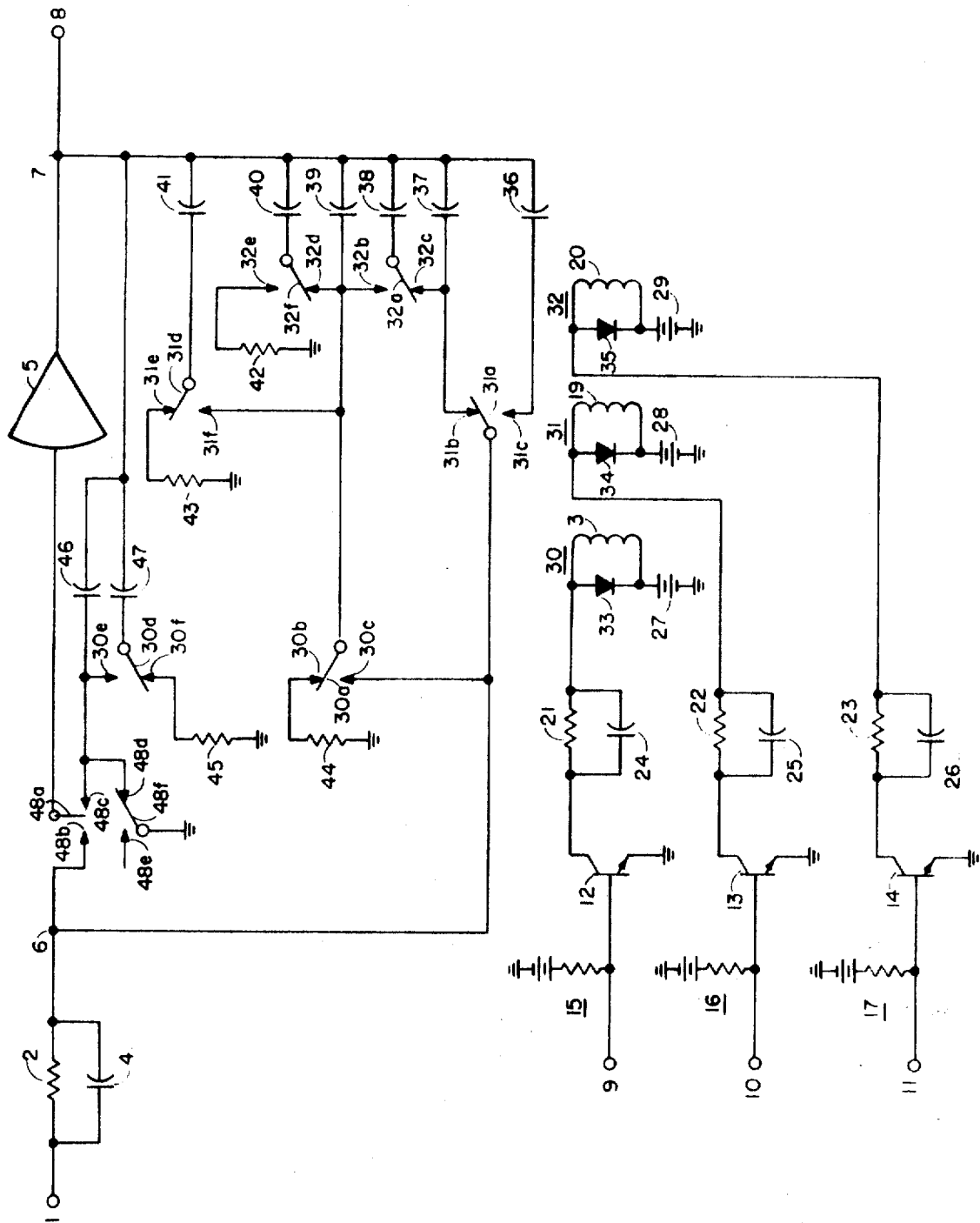

CAPACITOR-SWITCHING CIRCUIT

The present invention relates to the field of analog-computing elements and, more particularly, to a circuit arrangement for connecting different capacitors in the feedback loop of an analog-integrating circuit to vary the time of integration thereof.

The general purpose analog computer consists of a number of computing elements. One of the more frequently used of there is the operational amplifier connected as an integrator. The operational amplifier includes a high-gain direct-coupled negative feedback amplifier employing an AC amplifier for drift compensation and is capable of multiplying a varying voltage by a constant greater than unity.

The text *Analog Computation in Engineering Design*, by Rogers and Connolly, published by McGraw-Hill, Inc., 1960, section 2.3, describes in detail the operational amplifier and its connection as an integrator.

An important feature of analog computer in simulation of problems is the ability to vary the time of the problem events. With the problem solved on analog computers coming from many different branches of science, the events to be studied might occupy periods of many days, or they might be completed in less than a second. A change in speed from the one-to-one correspondence inherent in normal computing circuits is quite advantageous and is achieved by varying the time constants associated with the circuits. As the only time constants normally associated with an analog computer are those in the integrating amplifiers, a time change is effected by changing the integrator time constants.

From the well-known equation for an analog integrator, the time constant thereof is proportional to the values of both the feedback capacitor and the input resistor:

$$V_o = -\frac{1}{RC}\int V_i dt$$

where
$V_o$ = output voltage
$V_i$ = input voltage
$R$ = input resistor
$C$ = feedback capacitor
$t$ = time It has been suggested that the range of time scales necessary for the general analog computer simulation can be conveniently obtained by changing the values of the input resistors rather than changing the feedback capacitor. One problem with such an approach is the narrow range of time scales obtainable by such resistor variation. It is estimated that the range of scales available by changing input resistors is on the order of one thousand, either faster or slower than normal time. The integrator's current requirements at scales over one thousand fast, is grater than can be supplied by the preceding stage, while at times slower than one thousand slow, the input current required is so small that it is masked by error current of the operational amplifier caused by leakage, etc.

A further difficulty occurs because of the number of inputs used by an integrator when it is connected as a summing integrator. In the summing configuration, all input resistors must be varied to produce a given time scale.

Therefore, where time variations over one thousand faster or slower than real time is required, the value of the feedback capacitor is varied. The present invention is a simplified circuit for obtaining any one of six time scales by controlling the combinations of six capacitors. Selection is obtained by proper energization of three input lines conveniently available to the analog computer operator by means of the patch panel.

More particularly, six capacitors are capable of being connected in the feedback loop of an integrating amplifier via the control of three relays. Each relay has its coil connected to the collector of a normally conductive switching transistor. When a signal is removed from its base, the transistor becomes nonconductive causing deenergization of its associated relay. Selection of the desired time scale also selects the proper value of HOLD capacitor. More particularly, at the high rates of integration, (the millisecond range) a smaller value of HOLD capacitor is required because of the smaller value of current output available to charge the HOLD capacitor. At lower rates of integration (the seconds range), a larger valued HOLD capacitor can be employed because of the availability of charging current for the capacitor. A large value capacitor is desirable because of the decrease in drift with increase in value.

A primary object of the present invention is the provision of a simplified circuit for changing time scales in an analog-integrating circuit.

A further object of the present invention is the provision of six different time scales controlled by only three control lines.

These as well as other objects and advantages of the invention will become apparent to those skilled in the art from the following detailed description and specification thereof, reference being made to the accompanying drawings in which:

The single FIGURE is a schematic diagram of the preferred embodiment of the invention.

In FIG. 1, numeral 5 denotes a stabilized operational amplifier of the type normally used in analog computers. For example, such amplifier may be the one shown in U.S. Pat. No. 3,081,485 to M. A. Miller. The amplifier is characterized by very high input impedance drawing a very small amount of current so that point 6, called the summing junction, is considered a virtual ground.

An input resistor 2 is connected between the summing junction 6 and an input terminal 1. Capacitor 4 is connected across the input resistor to provide phase compensation for the amplifier.

From the aforementioned test of Rogers and Connolly, specifically Section 2.3, it is seen that when the impedance in the feedback loop around the amplifier is a capacitor, the amplifier functions as an electronic integrator. The rate of integration is inversely proportional to the value of that feedback capacitor.

The present invention provides six different rates of integration by connecting various combinations of capacitors 36—41 in the feedback loop of amplifier 5 between summing junction 6 and an output terminal 7. The connection of these capacitors is controlled by appropriate energization of one or more relays 30—32. These relays are switched by appropriate grounding of selected terminals 9—11.

More particularly, terminal 9 is connected to the base of a normally conductive NPN switching transistor 12 operating in the grounded emitter configuration. A biasing circuit 15 consisting of a resistor and a voltage source connected in series, is connected to the base of transistor 12. Grounding of terminal 9 removes the base bias from the transistor rendering transistor 12 nonconductive.

It will be understood that the operations described above are the same for switching transistors 13 and 14 and associated biasing circuits 16 and 17.

The collectors of the switching transistors are connected to respective relay coils, 3, 19 and 20. Diodes 33—35 are connected across each coil and to ground via voltage sources such as batteries 27—29. The diodes serve to suppress the surge current developed in the relay coils which occurs when transistors 12—14 are rendered nonconductive.

In operation, transistors 12—14 are biased ON by the voltage source and battery connected to their bases. A current path may thus be traced from voltage sources 27—29, relay coils 3, 19 and 20, resistors 21—23 and the collector, base and emitter of transistors 12—14 to ground. Relays 30—32 are thus energized and their respective moveable contacts are in a position opposite to that shown in the FIGURE. In the FIGURE, the relays are shown in their deenergized state.

Grounding of any of terminals 9—11 removes the base bias from transistors 12—14 rendering these transistors nonconductive breaking the current path through the relay coils. This causes the moveable contacts to drop to the deenergized state as shown in the FIGURE. Diodes 33—35 prevent the surge voltage developed by the collapse of the field in relay coils from damaging the switch transistors. When the transistors are rendered nonconductive, the polarity of the voltage across the coils reverses rendering diodes 33—35 conductive, thereby shorting the coils.

The parallel combination of respective resistors 21—23 and respective capacitors 24—26 provide current and voltage control for the relays. More particularly, when transistors 12—14 are rendered conductive, the full potential of voltage sources 27—29 are applied through the relay coils to ground via capacitors 24—26 which act as short circuits around resistors 21—23. This action provides sufficient power to energize the relay. As is well known, the relays require less power to hold them in a condition than to switch to another condition. Thus, after a brief interval of time, capacitors 24—26 are charged and a potential sufficient to hold the relay is maintained across the coil. This potential is determined by the combination of respective capacitors 24—26, resistors 21—23 and the impedance of relay coils 3, 19 and 20. The reduced power thus generated improves the accuracy of the integrator by minimizing the thermal voltage generated at the relay contacts.

As stated previously, selective energization of relays 30—32 control the value of capacitance connected in the feedback loop of operational amplifier 5 by selection appropriate ones of capacitors 36—41. More particularly, capacitor 36 is connected between output point 7 and summing junction 6 via fixed contact 31c of relay 31. Capacitor 37 is so connected via fixed contact 31b. Capacitor 38 is engaged via fixed contacts 32b, 32c, 30c and 31b. Capacitor 39 is connected in the feedback loop via fixed contact 30c while capacitor 40 requires engagement of the aforementioned contact 30c and contact 32d. Lastly, capacitor 41 is connected when both contacts 31f and 30c are engaged.

Capacitors 36—41 have values in microfarads as shown in the following table:

| Capacitor | Value |
|---|---|
| 36 | 0.0001 |
| 37 | 0.001 |
| 38 | 0.009 |
| 39 | 0.09 |
| 40 | 0.9 |
| 41 | 9.0099 |

With the relays in the deenergized state shown in FIGURE, only capacitors 38 and 37 are in the feedback loop. If the value of input resistor 2 is 1 megohm, and noting the equation describing the electronic integrator above, the time resultant time scale is 10 milliseconds. The remaining capacitor combinations are selected in accordance with the following table where $u$ denotes an ungrounded terminal, $g$ signifies the grounding of the terminal and $x$ means that the particular connection is not significant:

| | | Relays | | | Patch panel connections | | |
|---|---|---|---|---|---|---|---|
| Time scale | Capacitors | 30 | 31 | 32 | 9 | 10 | 11 |
| 10 seconds | 36, 39, 40, 41 | 1 | 1 | 0 | u | u | g |
| 1 second | 37, 38, 39, 40 | 1 | 0 | 0 | u | g | g |
| .1 second | 37, 38, 39 | 1 | 0 | 1 | u | g | u |
| 10 milliseconds | 37, 38 | 0 | 0 | 0 | g | g | g |
| 1 millisecond | 37 | 0 | 0 | 1 | g | g | u |
| 1 millisecond | 36 | 0 | 1 | x | g | u | x |

Resistors 42—44 connected to respective fixed contacts 32e, 31e, and 30b serve to provide a charging current path for those capacitors not connected in the feedback loop. This allows the problem time scale to be changed quickly, without the loss of problem voltages.

Capacitors 46 and 47 are the storage or HOLD elements for the analog-integrating circuit. Capacitor 47 is connected between output point 7 and ground via moveable contact 30d and fixed contact 30f of relay 30, and resistor 45. Capacitor 46 is grounded via fixed contact 48d and moveable contact 48f of OPERATE-HOLD relay 48.

When relay 48 is in the position shown in the FIGURE, signal at input terminal 1 is connected to amplifier 5 via fixed contact 48b and moveable contact 48a of relay 48. As both capacitors are connected to ground during the operate condition, they are both charged to save value proportional to the output signal of the integrating circuit at point 7.

When relay 48 is switched to the storage or HOLD mode, movable contact 48 engages fixed contact 48c while moveable contact 48f engages fixed contact 48e. Thus, the input terminal 1 is disconnected from the amplifier 5 and input to the amplifier is provided by the signal stored on capacitors 46 and 47.

Capacitor 46, in practice, has a value of 0.001 microfarad and is the storage capacitor for the high rates of integration. Capacitor 47 has a value of 1 microfarad and is used at the lower rates of integration. As previously set forth, different valued capacitors are required because of the different magnitudes of the current output of amplifier 5 at the higher and lower rates of integration.

Automatic selection of the proper sized storage capacitor is accomplished when relay 30 is energized. Energization of relay 30 results in the lower ranges of integration causing moveable contact 30a to engage fixed contact 30c and moveable contact 30d to engage fixed contact 30e. This places the large valued capacitor 47 in parallel with the small valued capacitor 46.

In the position shown in the drawing, small valued capacitor 46 would provide the storage if relay 48 were switched to the HOLD position.

We claim:

1. A circuit for controlling the rate of integration of an analog integrator by changing the value of capacitance in the feedback loop comprising:

amplifier means having input, output, and feedback means for integrating an analog signal;

six capacitors each having different values of capacitance for connection in said feedback means;

relay means connected to said capacitors for controlling the connection of various ones of said capacitors in said feedback means said relay means including;

a first relay having a first movable contact (32a) connected to a first of said capacitors (38), a second moveable contact (32f) connected to a second of said capacitors (40), a first fixed contact (32c) operatively associated with said first moveable contact connected to a third of said capacitors (37); a second fixed contact (32b) operatively associated with said first moveable contact and a third fixed contact (32d) operatively associated with said second moveable contact connected to a fourth of said capacitors (39);

a second relay including a third moveable contact (31a) connected to said input means, a fourth fixed contact (31c) operatively associated with said third moveable contact connected to a fifth of said capacitors (36), a fifth fixed contact (31b) operatively associated with said third moveable contact connected to said third capacitor (37), a forth moveable contact (31d) connected to a sixth of said capacitors (41), and a sixth fixed contact (31f) operatively associated with said fourth moveable contact connected to said forth capacitor;

a third relay including a fifth moveable contact (30a) connected to said fourth capacitor, and a seventh fixed contact connected to said input means; and respective relay control circuits connected to each of said relays for controlling the actuation thereof and thereby the connection of said capacitors in said feedback means.

2. The circuit of claim 1 further including seventh (46) and eighth (47) capacitors connected to said output means for storing the output of said amplifier and wherein said third relay includes a sixth moveable contact (30d) connected to said eighth capacitor, and an eighth fixed contact connected to said seventh capacitor and to said input means for controlling the connection of said seventh and eighth capacitors in said feedback means.